Figure 1:
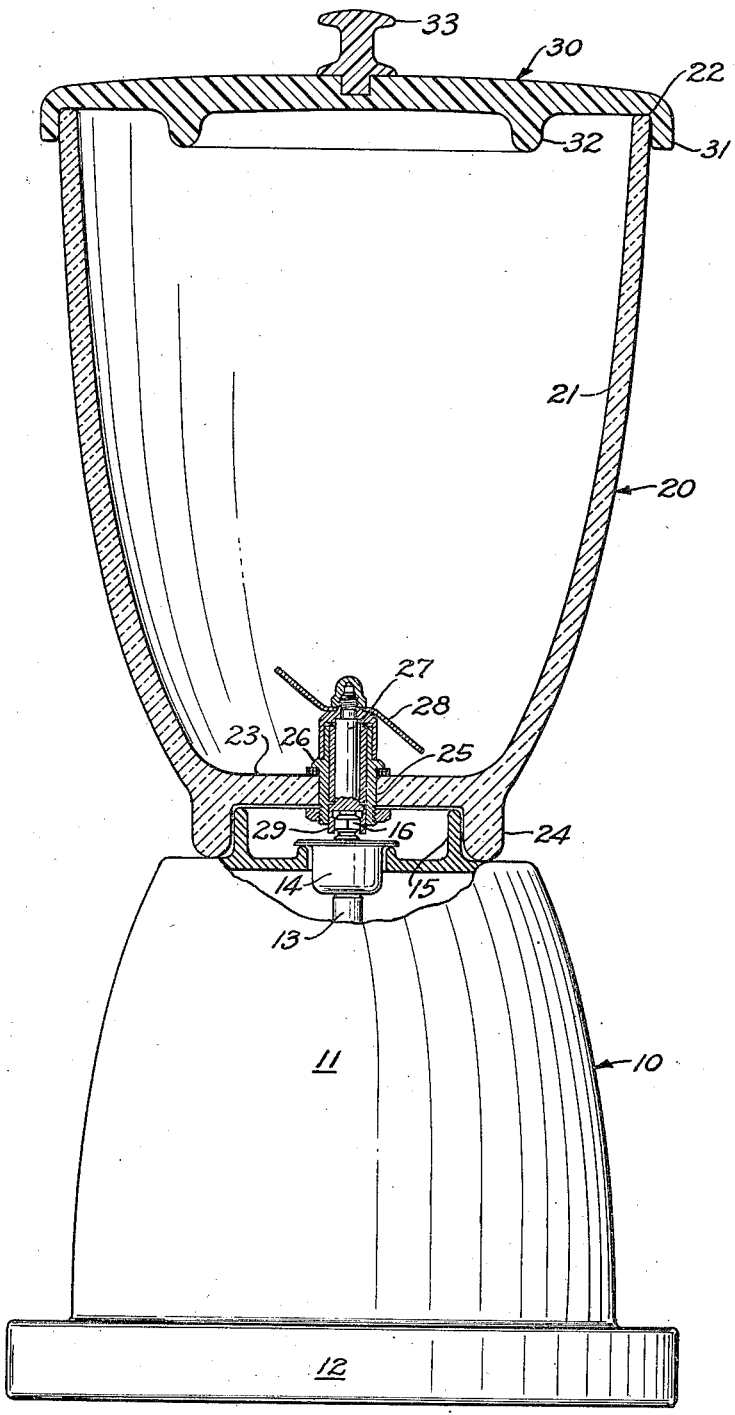

July 23, 1957 E. L. SNYDER 2,800,310
FLUID BLENDERS
Filed Feb. 21, 1955 2 Sheets-Sheet 1

July 23, 1957 E. L. SNYDER 2,800,310
FLUID BLENDERS
Filed Feb. 21, 1955 2 Sheets-Sheet 2

United States Patent Office 2,800,310
Patented July 23, 1957

2,800,310
FLUID BLENDERS

Eugene L. Snyder, Canton, Ohio, assignor to The Hoover Company, North Canton, Ohio, a corporation of Ohio Application February 21, 1955, Serial No. 489,480

1 Claim. (Cl. 259—108)

The present invention relates to fluid blenders for mixing drinks and food, such as milkshakes, etc.

The present invention relates particularly to an assembly whereby the bowl of the blender may be nested with the power unit to provide a compact arrangement, whereby the blender is capable of performing all of the functions of an ordinary blender, but yet may be nested so as to occupy a small space for storage purposes.

Blenders or drink mixers are a well known article of commerce and comprise a power unit mounted on a base so that it may be supported on a suitable horizontal surface such as a table or drain board of a sink.

Prior drink mixers have been difficult to store because the power unit usually had to be stored separately from the mixing receptacle. In prior drink mixers, the power unit comprised a massive base including a casing enclosing the motor with a rotatable shaft extending upwardly therefrom, the shaft being formed with a detachable driving connection for connection to the shaft of the rotatable blender blades, rotatably mounted and extending through the bottom of the blender receptacle.

The blender receptacle itself, in prior constructions, is a comparatively tall receptacle and has to be stored on top of the power unit in its position of use or stored separately. In either case, the storage of the blender was somewhat of a problem and took up considerable space.

According to the present invention, the power unit is formed of a sort of frustro conical formation having a ledge extending outwardly adjacent its bottom end, and the receptacle is of a similar but inverted shape of somewhat larger periphery, whereby it may be inverted for storage purposes and placed over the power unit with the edge of its open end resting on the ledge of the power unit.

The top of the power unit casing and the bottom of the receptacle are formed with interfitting non circular vertically extending flanges or ribs so that in use the receptacle may be non rotatably mounted on the top of the power unit with the driving and driven shafts in driving detachable connection with each other. The cover for the receptacle has a pair of downwardly extending flanges or ribs, the outer of which fits about the upper end of the receptacle when the device is in use, and the inner of which fits about the flange on the lower end of the receptacle when it is inverted for storage purposes.

Figure 2:
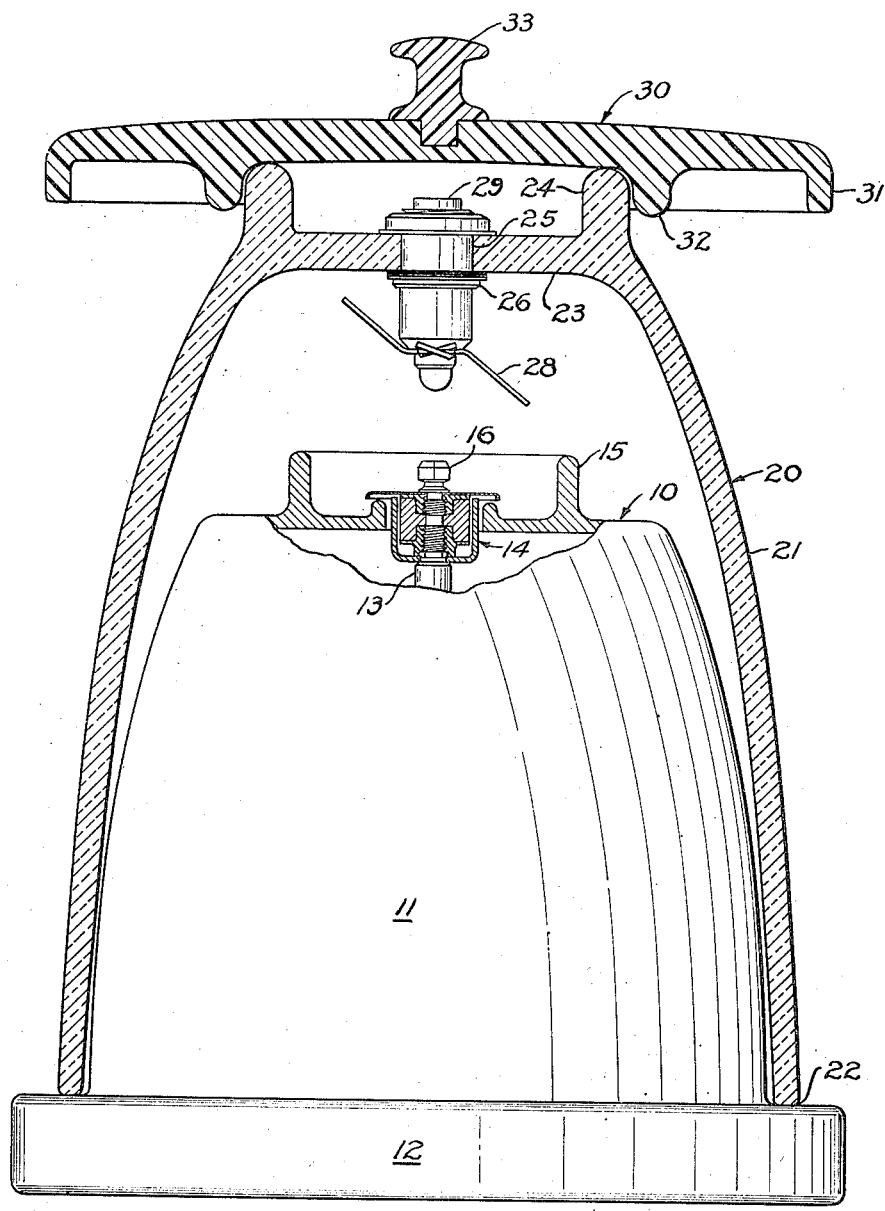

Other objects and advantages of the present invention will become apparent as the description proceeds when taken in connection with the accompanying drawings in which:

Figure 1 is a side view of the blender of the present invention showing the parts in the position of use, and Figure 2 is a similar view to that of Figure 1 showing the parts in their storage position.

Referring to the drawings, the reference numeral 10 generally represents the power unit of the blender of the present invention. It comprises a casing 11 of a generally frustro conical shape, housing a driving motor (not shown) and a peripherally outwardly extending ledge 12. The motor drives a shaft 13 mounted for rotation in a bearing 14 positioned centrally in the top of the casing 11. Casing 11 is provided with an upwardly extending peripheral non circular flange 15 for a purpose which will presently appear. The shaft 13 is extended upwardly at 16 to form a driving connection centrally of and within the flange 15.

The blender receptacle is generally indicated by the reference numeral 20 and comprises a frustro conical side wall 21 having an upper edge 22, a bottom 23, and a downwardly extending flange or rib 24 of a shape and size to fit about the upwardly extending flange or rib 15 of the power unit 10.

The bottom 23 of the receptacle 20 is provided with a central opening 25, in which is clamped a bearing 26 which rotatably supports a shaft 27 having blender blades 28 mounted on its upper end, and a female driving connection 29 at its lower end for detachable driving connection with the male driver 16 of the power unit 10.

The cover or lid for the receptacle 20 is generally indicated by the reference numeral 30 and includes a peripheral downwardly extending flange or rib 31 which fits about the upper edge 22 of the receptacle 20 to close the same when the device is in use.

Inwardly of the peripheral flange or rib 21 is downwardly extending rib or flange 32 of the shape and size to fit about the exterior of the flange or rib 24 on the bottom of the receptacle 20. A handle 33 is provided for the cover 30.

The upper rim 22 of receptacle 20 is of a shape and size to just encircle the bottom of the casing 11 so that its edge may rest upon the ledge 12 and its sidewall is frustro conical and of a size and shape to fit about and enclose the casing 11 when the receptacle is inverted for storage purposes as shown in Figure 2.

The rib 32 of cover 30 is of a shape and size to fit about the rib or flange 24 on the bottom of receptacle 20 to provide a storage position for the lid or cover 30 as shown in Figure 2.

Operation

In normal use, the device is positioned as shown in Figure 1. The rib or flange 24 on the bottom of the receptacle 20 fits about the upwardly extending rib or flange 15 of the power unit 10 so as to prevent relative rotation between them. The male and female driving connections 16 and 29 are interconnected so that when the power unit 10 is energized, the mixer blades 28 will be rapidly rotated.

When it is desired to store the device, the cover 30 and receptacle 20 may be suitably cleaned. The receptacle 20 is then inverted as in Figure 2 with its upper edge or rib 22 resting on the ledge 12 of the power unit and its wall 21 surrounding the casing 11 of the power unit as in Figure 2. The cover 30 may then be placed on top of the receptacle 20 with the rib or flange 32 of the cover encircling the rib 24 on the bottom of the receptacle 20.

Thus, the present invention provides an arrangement by which the parts of a blender unit may be rearranged for storage purposes in such a position that the space occupied will not greatly exceed that of one of the component parts of the combination.

While I have shown and described but a single embodiment of my invention, it is to be understood that the embodiment is to be taken as illustrative only and not in a limiting sense. I do not wish to be limited to the particular structure shown and described, but wish to include all equivalent variations thereof except as limited by the scope of the claim.

I claim:

In a blender, a power unit including a casing having an enlarged annular base forming a lower annular ledge with said casing and a reduced upper section having an upwardly extending rib or flange, a power take-off shaft positioned centrally of said reduced upper section and a blender receptacle having blender blades rotatably mounted in the bottom of said receptacle, a driving shaft for said blades extending through the bottom of said receptacle for detachable driving connection with said power take-off shaft, an annular rib or flange extending downwardly from the bottom of said receptacle and shaped to fit about said upwardly extending rib or flange of said casing, the open mouth of said receptacle being shaped to fit about and rest upon said lower annular ledge whereby said receptacle may be inverted and nested about said casing, a cover for said receptacle, said cover having a downwardly extending peripheral rib or flange shaped to fit about the open upper end of said receptacle and a second downwardly extending annular rib inwardly of said outer rib shaped to fit about the annular rib on the bottom of said receptacle whereby said cover may be nested over the bottom of said receptacle when the latter is inverted and nested over said casing.

References Cited in the file of this patent

UNITED STATES PATENTS

| | | |
|---|---|---|
| 640,860 | Baum | Jan. 9, 1900 |
| 1,563,413 | Whitcomb | Dec. 1, 1925 |
| 1,823,314 | Brewer | Sept. 15, 1931 |
| 2,028,595 | Flegel | Jan. 21, 1936 |
| 2,599,275 | Nelson | June 3, 1952 |
| 2,695,115 | Roop | Nov. 23, 1954 |
| 2,720,329 | Kochner | Oct. 11, 1955 |
| 2,758,623 | Malz et al. | Aug. 14, 1956 |

FOREIGN PATENTS

| | | |
|---|---|---|
| 494,648 | Belgium | Apr. 15, 1950 |
| 1,072,517 | France | Mar. 17, 1954 |